July 30, 1957  J. E. JONES  2,801,172
SUPERSENSITIZATION OF OPTICAL SENSITIZATION
Filed Feb. 23, 1956

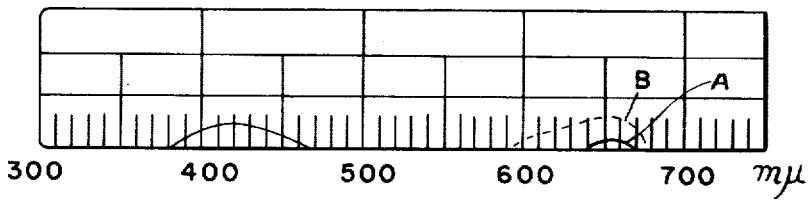

A = 3,3'- DIETHYLOXATHIADICARBOCYANINE IODIDE

B = 3,3'- DIETHYLOXATHIADICARBOCYANINE IODIDE WITH POTASSIUM MELONATE

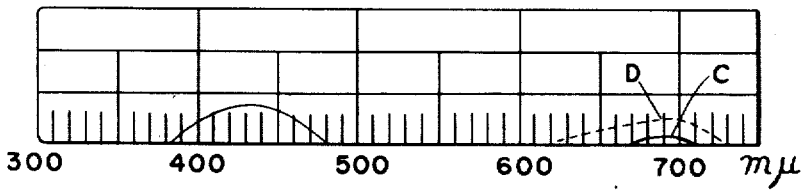

C = 3,3'- DIETHYLTHIADICARBOCYANINE IODIDE

D = 3,3'- DIETHYLTHIADICARBOCYANINE IODIDE WITH POTASSIUM MELONATE

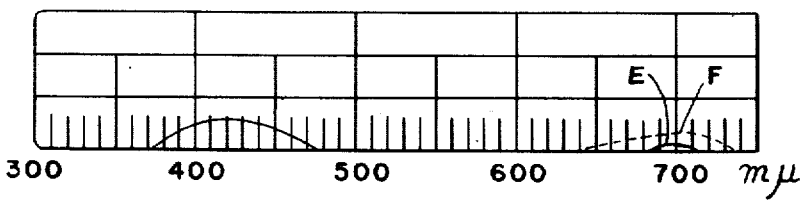

E = 3,3'- DIETHYLSELENADICARBOCYANINE BROMIDE

F = 3,3'- DIETHYLSELENADICARBOCYANINE BROMIDE WITH POTASSIUM MELONATE

JEAN E. JONES
INVENTOR.
BY
ATTORNEYS.

United States Patent Office 2,801,172
Patented July 30, 1957

2,801,172

SUPERSENSITIZATION OF OPTICAL SENSITIZATION

Jean E. Jones, Rochester, N. Y., assignor to Eastman Kodak Company, Rochester, N. Y., a corporation of New Jersey Application February 23, 1956, Serial No. 567,146

20 Claims. (Cl. 96—104)

This invention relates to photographic silver halide emulsions containing dicarbocyanine dyes and in supersensitizing combination therewith, hydromelonic acid, cyameluric acid, or an alkali metal salt thereof.

It is known in the art of making photographic emulsions that certain dyes of the cyanine class alter the sensitivity of photographic emulsions of the gelatino-silver-halide kind, when the dyes are incorporated in the emulsions. It is also known that the sensitization produced by a given dye varies somewhat with the type of emulsion in which the dye is incorporated. Furthermore, the sensitization of a given emulsion by a given dye may be altered by varying the conditions in the emulsion. For example, the sensitization may be increased by increasing the silver ion concentration or decreasing the hydrogen ion concentration (i. e., increasing the alkalinity) or both. Thus, sensitization can be increased by bathing plates, coated with a spectrally sensitized emulsion, in water or in aqueous solutions of ammonia. Such a process of altering the sensitivity of a sensitized emulsion by increasing the silver ion concentration and/or by decreasing the hydrogen ion concentration is commonly called "hypersensitization". Hypersensitized emulsions have generally poor keeping qualities.

I have now found another means of altering the sensitivity in emulsions containing dicarbocyanine dyes. Since the conditions in the emulsion, i. e., the hydrogen ion and/or the silver ion concentration undergo little or no change in my method, I shall designate my method as a kind of supersensitization.

It is, therefore, an object of my invention to provide photographic emulsions containing dicarbocyanine dyes and as supersensitizers therefor, certain derivatives of melon and cyameluric acid, particularly hydromelonic acid, cyameluric acid, or an alkali metal salt of these acids. Another object is to provide a means for preparing these supersensitized emulsions. Other objects will become apparent from a consideration of the following description and examples.

While the derivatives of melon and cyameluric acid employed in my invention have been previously employed in photographic emulsions which have been optically sensitized with "cyanine" and "merocyanine" dyes, the effects observed in the instant invention are not general. That is, it has been found that no significant (or measureable) supersensitizing effect is observed with many simple cyanine and carbocyanine dyes. It was not expected, therefor, that the useful results illustrated below could be obtained with dicarbocyanine dyes.

The dicarbocyanine dyes which are useful in practicing my invention include those represented by the following general formula:

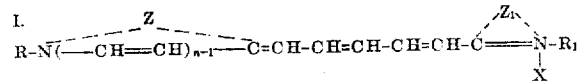

wherein R and R₁ each represents an alkyl group (such as methyl, ethyl, β-hydroxyethyl, carboxymethyl, β-carboxyethyl, carbomethoxymethyl, carbethoxymethyl, etc., $n$ represents a positive integer of from 1 to 2, X represents an acid radical, such as chloride, iodide, bromide, perchlorate, p-toluenesulfonate, benzenesulfonate, ethylsulfate, methylsulfate, etc., Z represents the non-metallic atoms necessary to complete a heterocyclic nucleus containing from 5 to 6 atoms in the heterocyclic ring, e. g., a heterocyclic nucleus of the benzothiazole series (e. g., benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4 - methoxybenzothiazole, 5 - methoxybenzothiazole, 6-methoxybenzothiazole, 6 - iodobenzothiazole, 5 - iodobenzothiazole, 4 - ethoxybenzothiazole, 5 - ethoxybenzothiazole, 5, 6 - dimethylbenzothiazole, 5 - hydroxybenzothiazole, 6 - hydroxybenzothiazole, etc.), a heterocyclic nucleus of the naphthothiazole series (e. g., α-naphthothiazole, β-naphthothiazole, 7-methoxy-α-naphthothiazole, 8 - methoxy - α - naphthothiazole, 5 - methoxy - β - naphthothiazole, 5 - ethoxy - α - naphthothiazole, etc.), a heterocyclic nucleus of the benzoselenazole series (e. g., benzoselenazole, 5 - chlorobenzoselenazole, 6 - methoxybenzoselenazole, 5 - methoxybenzoselenazole, etc.), a heterocyclic nucleus of the naphthoselenazole series (e. g., α - naphthoselenazole, β - naphthoselenazole, etc.), a heterocyclic nucleus of the benzoxazole series (e. g., benzoxazole, 5 - hydroxybenzoxazole, 6 - hydroxybenzoxazole, 5 - chlorobenzoxazole, 5 - methoxybenzoxazole, 6 - methoxybenzoxazole, 5 - phenylbenzoxazole, 5 - bromobenzoxazole, etc.), a heterocyclic nucleus of the naphthoxazole series (e. g., α - naphthoxazole, β - naphthoxazole, etc.), a heterocyclic nucleus of the 2 - quinoline series (e. g., 2 - quinoline, 6 - methyl - 2 - quinoline, 7 - methyl-2 - quinoline, 8 - methyl - 2 - quinoline, 6 - chloro - 2-quinoline, 8 - chloro - 2 - quinoline, 4 - chloro - 2 - quinoline, 5 - ethoxy - 2 - quinoline, 6 - ethoxy - 2 - quinoline, 7 - ethoxy - 2 - quinoline, 6 - hydroxy - 2 - quinoline, 7-hydroxy - 2 - quinoline, 6 - methoxy - 2 - quinoline, etc.), a heterocyclic nucleus of the 4-quinoline series (e. g., 4-quinoline, 6 - methoxy - 4 - quinoline, 7 - methyl - 4-quinoline, 8 - methyl - 4 - quinoline, etc.), a heterocyclic nucleus of the benzimidazole series (e. g., benzimidazole, 5 - chlorobenzimidazole, 5,6 - dichlorobenzimidazole, 1,7-trimethylenebenzimidazole, etc.), and a heterocyclic nucleus of the 5,6 - benzoquinoline series (e. g., 5,6-benzo-2 - quinoline, etc.), and $Z_1$ represents the non-metallic atoms necessary to complete a heterocyclic nucleus selected from the group consisting of those of the benzoxazole series (e. g., such as those defined by Z above), those of the naphthoxazole series (e. g., such as those defined by Z above), those of the benzoselenazole series (e. g., such as those defined by Z above), those of the naphthoselenazole series (e. g., such as those defined by Z above), those of the benzothiazole series (e. g., such as those defined by Z above), and those of the naphthothiazole series (e. g., such as those defined by Z above).

The preparation of melon and alkali metal salts of hydromelonic and cyameluric acids is described in "J. A. C. S.," vol. 61, page 3420 and vol. 62, page 842. Hydromelonic and cyameluric acid are believed to have the formulas represented below, although it is to be understood that I intend these formulas to embrace all isomeric or tautomeric forms which the literature identifies as hydromelonic and cyameluric acids. That is, while there may be some uncertainty as to the configuration shown in the formulas, there is no uncertainty as to the identity of these products.

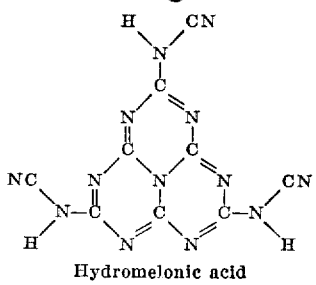

Hydromelonic acid

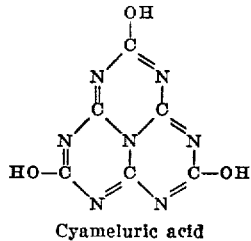

Cyameluric acid

By alkali metal salt, I mean sodium, potassium, etc., salts. The above acids and their alkali metal salts are hereinafter referred to as triazine compounds for the sake of convenience.

According to my invention, I incorporate one or more of the dicarbocyanine dyes represented by Formula I above with one or more triazine compounds. My invention is particularly directed to the ordinarily employed gelatino-silver-halide emulsions. However, my supersensitizing combinations can be employed in silver halide emulsions in which the carrier is other than gelatin, e. g., a resinous substance or cellulosic material which has no deteriorating effect on the light-sensitive materials. The dicarbocyanine dyes and triazine compounds can be employed in various concentrations depending upon the effects desired.

Ordinarily, the optimum or near optimum concentration of the dicarbocyanine dyes which I employ in practicing my invention is of the order of from 0.010 to 0.30 g. per mol. of silver halide in the emulsion.

The triazine compounds which I employ in my invention can advantageously be employed at a concentration of from about 0.03 to 5.0 g. per mol. of silver halide in the emulsion.

In general, the ratio of concentration of dicarbocyanine dye to triazine compound can vary rather widely in my combinations, e. g., from 1:1 to 1:300 (by weight) in many cases.

The methods of incorporating sensitizing dyes in silver halide emulsions are well known to those skilled in the art. The triazine compounds can be directly dispersed in the emulsions, or they can be dissolved in water and added in the form of their solutions. While the dicarbocyanine dyes can be directly dispersed in the emulsions, it is convenient to add the same in the form of solutions in appropriate solvents. Methanol, ethanol, pyridine, and the like have proven satisfactory for many of the dyes of Formula I. Mixtures of solvents, e. g., pyridine diluted with methanol or acetone, can also be used. The dicarbocyanine dyes and triazine compounds are dispersed in the finished emulsions and should be uniformly distributed throughout the emulsions. The following procedure is satisfactory: Stock solutions of the dicarbocyanine dyes and triazine compounds are prepared by dissolving the same in appropriate solvents as described above. Then, to the flowable gelatino-silver-halide emulsion, the desired amounts of the stock solution of one of the dyes (or triazine compounds) are slowly added, while stirring the emulsion. Stirring is continued until the dye is thoroughly incorporated in the emulsion. Then the desired amount of the stock solution of the triazine compound (or dye, if triazine compound has been added first) is slowly added to the emulsion, while stirring. Stirring is continued until the second solution is thoroughly incorporated. The supersensitized emulsion can then be coated out on a suitable support, such as glass, cellulose derivative film, resin film, or paper, to a suitable thickness and allowed to dry. The details of such coating methods are well known to those skilled in the art. The foregoing procedures and proportions are to be regarded only as illustrative. Clearly, my invention is directed to any silver halide emulsion containing a combination of the aforesaid dicarbocyanine dyes and triazine compounds whereby a supersensitizing effect is obtained.

The following examples will serve to illustrate further the manner of practicing my invention.

In Table I below, to different portions of the same batch, of photographic gelatino-silver-bromiodide emulsion were added (1) a dicarbocyanine dye, such as those represented by Formula I above, and (2) a combination of the dicarbocyanine dye and a triazine compound (in neutral aqueous solution). Then the emulsions were held at about 50–52° C. for a short time and coated on a support, chill set, and dried. After exposure through a Wratten No. 25 filter, i. e., a filter which transmits substantially no light of wavelength shorter than about 580 mu, in an Eastman Type Ib sensitometer, the film strips were processed for 4 minutes in a developer having the following composition:

| | Grams |
|---|---|
| N-methyl-p-aminophenol sulfate | 2.0 |
| Hydroquinone | 8.0 |
| Sodium sulfite (desiccated) | 90.0 |
| Sodium carbonate (monohydrate) | 52.5 |
| Potassium bromide | 5.0 |
| Water to make 1 liter. | |

The speed (red), gamma and fog for each of the coatings was then measured. The results are recorded in Table I.

Table I

| Example | Sensitizing Dye and Addenda (g./mol. AgX) | Red Light Exposure | | |
|---|---|---|---|---|
| | | 30/E Speed | Gamma | Fog |
| 1 | (a) 3,3'-diethyloxathiadicarbocyanine iodide (.05). | 2.25 | .61 | .05 |
| | (b) dye (a) (.05) with potassium melonate (1.8). | 21.5 | 2.8 | .06 |
| 2 | (c) 3,3'-diethylthiadicarbocyanine iodide (.05). | 5.2 | .82 | .06 |
| | (d) dye (c) (.05) with potassium melonate (1.0). | 15.0 | 2.5 | .05 |
| 3 | (e) 3,3'-diethylselenadicarbocyanine bromide (.05). | 4.5 | .90 | .07 |
| | (f) dye (e) (.05) with potassium melonate (1.0). | 11.4 | 2.7 | .05 |
| 4 | (g) 3,3'-diethyl-6,7,6',7'-dibenzoxadicarbocyanine iodide (.05). | 3.9 | 1.1 | .06 |
| | (h) dye (g) (.05) with potassium melonate (1.0). | 11.9 | 2.7 | .06 |
| 5 | (i) 3,3'-dimethyl-4,5,4',5'-dibenzothiadicarbocyanine chloride (.05). | nil | nil | .06 |
| | (j) dye (i) (.05) with potassium melonate (1.0). | 11.4 | 2.4 | .06 |
| 6 | (k) 3,3'-diethyl-4,5,4',5'-dibenzoselenadicarbocyanine iodide (.05). | nil | nil | .06 |
| | (l) dye (k) (.05) with potassium melonate (1.0). | 3.5 | 1.0 | .06 |
| 7 | (m) dye (a) (.05) | 2.25 | .61 | .05 |
| | (n) dye (a) (.05) with cyameluric acid. | 8.6 | 2.3 | .06 |

My invention is primarily directed to the ordinarily employed gelatino-silver-halide developing-out emulsions, e. g., gelatino-silver-chloride, -chlorobromide, -chloroiodide, -chlorobromiodide, -bromide and -bromiodide developing-out emulsions. Emulsions which form the latent image mostly inside the silver halide grains, such as the emulsions set forth in U. S. Patent 2,456,956, dated December 21, 1948, can also be employed in practicing my invention.

The emulsions prepared in accordance with my invention can be coated in the usual manner on any suitable support, e. g., glass, cellulose nitrate film, cellulose acetate film, polyvinyl-acetal resin film, paper or metal.

Photographic silver halide emulsions, such as those listed above, containing the supersensitizing combinations of my invention can also contain such addenda as chemical sensitizers, e. g., sulfur sensitizers (e. g., allyl thiocarbamide, thiourea, allylisothiocyanate, cystine, etc.), various gold compounds (e. g., potassium chloroaurate, auric trichloride, etc.) (see U. S. Patents 2,540,085; 2,597,856 and 2,597,915), various palladium compounds, such as palladium chloride (U. S. 2,540,086), potassium chloropalladate (U. S. 2,598,079), etc., or mixtures of such sensitizers; anti-foggants, such as ammonium chloroplatinate (U. S. 2,566,245), ammonium chloroplatinite (U. S. 2,566,263), benzotriazole, nitrobenzimidazole, 5-nitroindazole, benzidine, mercaptans, etc. (see Mees—"The Theory of the Photographic Process," Macmillan Pub., page 460), or mixtures thereof; hardeners, such as formaldehyde (U. S. 1,763,533), chrome alum (U. S. 1,763,533), glyoxal (U. S. 1,870,354), dibromacrolein (Br. 406,750), etc.; color couplers, such as those described in U. S. Patent 2,423,730, Spence and Carroll U. S. Patent 2,640,776, etc.; or mixtures of such addenda. Dispersing agents for color couplers, such as those set forth in U. S. Patents 2,322,027 and 2,304,940, can also be employed in the above-described emulsions.

The triazine compounds of my invention are generally (though not necessarily) employed in neutral aqueous solution as shown above, i. e., the free acids are at least partially neutralized with sodium hydroxide, potassium hydroxide, sodium carbonate, ammonia, triethylamine, etc., before use in the emulsions. It is thus possible to adjust the pH of these aqueous solutions so that they are about the same as the pH of the emulsions.

The accompanying drawing illustrates the supersensitizing effect obtained with three of my new combinations of dyes in gelatino-silver-bromiodide emulsions. Each figure in the drawing is a diagrammatic reproduction of two spectrograms. In each figure, the sensitivity of the emulsion containing only the dicarbocyanine dye of Formula I is represented by the solid curve. The sensitivity of the same emulsion containing both a dicarbocyanine dye and a triazine compound is represented by the curve consisting of dotted lines. No curve showing the triazine compound alone is shown, since this compound did not have any significant effect in the silver bromiodide emulsion employed.

In Figure 1, curve A represents the sensitivity of an ordinary gelatino-silver-bromiodide emulsion sensitized with 3,3'-diethyloxathiadicarbocyanine iodide and curve B represents the sensitivity of the same emulsion sensitized with 3,3'-diethyloxathiadicarbocyanine iodide and potassium melonate. The sensitometric measurements for these emulsions are given in Example 1 of the above table.

In Figure 2, curve C represents the sensitivity of an ordinary gelatino-silver-bromiodide emulsion sensitized with 3,3'-diethylthiadicarbocyanine iodide and curve D represents the sensitivity of the same emulsion sensitized with 3,3'-diethylthiadicarbocyanine iodide and potassium melonate. The sensitometric measurements for these emulsions are given in Example 2 of the above table.

In Figure 3, curve E represents the sensitivity of an ordinary gelatino-silver-bromiodide emulsion sensitized with 3,3'-diethylselenacarbocyanine bromide and curve F represents the sensitivity of the same emulsion sensitized with 3,3'-diethylselenadicarbocyanine bromide and potassium melonate. The sensitometric measurements for these emulsions are given in Example 3 of the above table.

In a manner similar to that illustrated in the above table, other dicarbocyanine dyes can be employed in combination with the triazine compounds of my invention to advantage. Other such dicarbocyanine dyes are disclosed in the copending applications of Carroll, Jones and Spence Serial Nos. 540,052-3, filed October 12, 1955, and McFall and Crookshank Serial No. 540,001, filed October 12, 1955.

Also, as mentioned above, I have found that water-soluble salts of the melon compounds of my invention, other than alkali metal salts, can be employed to advantage. Such water-soluble salts include ammonium salts and organic amine salts, such as triethanolamine, triethylamine, pyridine, etc.

What I claim as my invention and desire secured by Letters Patent of the United States is:

1. A photographic silver halide emulsion sensitized with a supersensitizing combination of at least one dicarbocyanine dye and at least one compound selected from the group consisting of hydromelonic acid, cyameluric acid, an alkali metal melonate and an alkali metal cyamelurate.

2. A photographic silver halide emulsion sensitized with a supersensitizing combination of at least one dicarbocyanine dye selected from those represented by the following general formula:

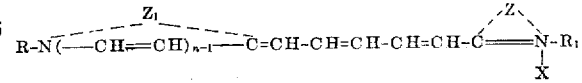

wherein R and R₁ each represents an alkyl group, $n$ represents a positive integer of from 1 to 2, X represents an acid radical, Z represents the non-metallic atoms necessary to complete a heterocyclic nucleus selected from the group consisting of those of the benzothiazole series, those of the naphthothiazole series, those of the benzoxazole series, those of the naphthoxazole series, those of the benzoselenazole series, and those of the naphthoselenazole series, and Z₁ represents the non-metallic atoms necessary to complete a heterocyclic nucleus selected from the group consisting of those of the benzothiazole series, those of the naphthothiazole series, those of the benzoxazole series, those of the naphthoxazole series, those of the benzoselenazole series, those of the naphthoselenazole series, those of the 2-quinoline series, those of the 4-quinoline series, those of the benzimidazole series, and those of the 5,6-benzoquinoline series, and at least one compound selected from the group consisting of hydromelonic acid, cyameluric acid, an alkali metal melonate and an alkali metal cyamelurate.

3. A photographic gelatino-silver-bromoiodide emulsion sensitized with a supersensitizing combination of at least one dicarbocyanine dye selected from those represented by the following general formula:

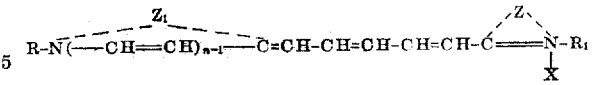

wherein R and R₁ each represents an alkyl group containing from 1 to 2 carbon atoms, $n$ represents a positive integer of from 1 to 2, X represents an acid radical, Z represents the non-metallic atoms necessary to complete a heterocyclic nucleus selected from the group consisting of those of the benzothiazole series, those of the naphthothiazole series, those of the benzoxazole series, those of the naphthoxazole series, those of the benzoselenazole series, and those of the naphthoselenazole series, and Z₁ represents the non-metallic atoms necessary to complete a heterocyclic nucleus selected from the group consisting of those of the benzothiazole series, those of the naphthothiazole series, those of the benzoxazole series, those of the naphthoxazole series, those of the benzoselenazole series, those of the naphthoselenazole series, those of the 2-quinoline series, those of the 4-quinoline series, those of the benzimidazole series, and those of the 5,6-benzoquinoline series, and at least one compound selected from the group consisting of hydromelonic acid, cyameluric acid, an alkali metal melonate and an alkali metal cyamelurate.

4. A photographic gelatino-silver-halide developing-out emulsion sensitized with a supersensitizing combination of a dicarbocyanine dye selected from those represented by the following general formula:

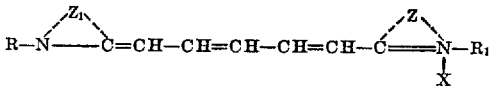

wherein R and R₁ each represents an alkyl group containing from 1 to 2 carbon atoms, X represents an acid radical, Z represents the non-metallic atoms necessary to complete a heretocyclic nucleus of the benzothiazole series and Z₁ represents the non-metallic atoms necessary to complete a heterocyclic nucleus of the benzoxazole series, and a compound selected from the group consisting of hydromelonic acid, cyameluric acid, an alkali metal melonate and an alkali metal cyamelurate.

5. A photographic gelatino-silver-halide developing-out emulsion sensitized with a supersensitizing combination of a dicarbocyanine dye selected from those represented by the following general formula:

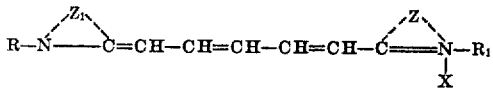

wherein R and R₁ each represents an alkyl group containing from 1 to 2 carbon atoms, X represents an acid radical, Z represents the non-metallic atoms necessary to complete a heterocyclic nucleus of the benzothiazole series and Z₁ represents the non-metallic atoms necessary to complete a heterocyclic nucleus of the benzoxazole series, and an alkali metal melonate.

6. A photographic gelatino-silver-halide developing-out emulsion sensitized with a supersensitizing combination of a dicarbocyanine dye selected from those represented by the following general formula:

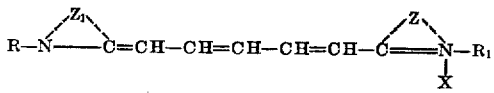

wherein R and R₁ each represents an alkyl group containing from 1 to 2 carbon atoms, X represents an acid radical, Z represents the non-metallic atoms necessary to complete a heterocyclic nucleus of the benzothiazole series and Z₁ represents the non-metallic atoms necessary to complete a heterocyclic nucleus of the benzoxazole series, and potassium melonate.

7. A photographic gelatino-silver-halide developing-out emulsion sensitized with a supersensitizing combination of 3,3′-diethyloxathiadicarbocyanine iodide and potassium melonate.

8. A photographic gelatino-silver-halide developing-out emulsion sensitized with a supersensitizing combination of a symmetrical dicarbocyanine dye selected from those represented by the following general formula:

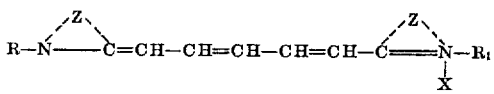

wherein R and R₁ each represents an alkyl group containing from 1 to 2 carbon atoms, X represents an acid radical, and Z represents the non-metallic atoms necessary to complete a heterocyclic nucleus of the benzothiazole series, and a compound selected from the group consisting of hydromelonic acid, cyameluric acid, an alkali metal melonate and an alkali metal cyamelurate.

9. A photographic gelatino-silver-halide developing-out emulsion sensitized with a supersensitizing combination of a symmetrical dicarbocyanine dye selected from those represented by the following general formula:

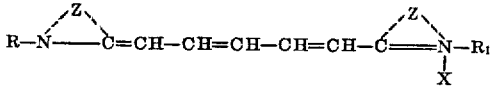

wherein R and R₁ each represents an alkyl group containing from 1 to 2 carbon atoms, X represents an acid radical and Z represents the non-metallic atoms necessary to complete a heterocyclic nucleus of the benzothiazole series and an alkali metal melonate.

10. A photographic gelatino-silver-halide developing-out emulsion sensitized with a supersensitizing combination of a symmetrical dicarbocyanine dye selected from those represented by the following general formula:

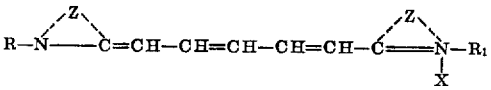

wherein R and R₁ each represents an alkyl group containing from 1 to 2 carbon atoms, X represents an acid radical, and Z represents the non-metallic atoms necessary to complete a heterocyclic nucleus of the benzothiazole series and potassium melonate.

11. A photographic gelatino-silver-halide developing-out emulsion sensitized with a supersensitizing combination of 3,3′-diethylthiadicarbocyanine iodide and potassium melonate.

12. A photographic gelatino-silver-halide developing-out emulsion sensitized with a supersensitizing combination of a symmetrical dicarbocyanine dye selected from those represented by the following general formula:

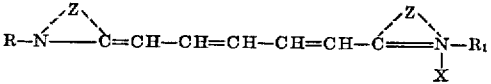

wherein R and R₁ each represents an alkyl group containing from 1 to 2 carbon atoms, X represents an acid radical, and Z represents the non-metallic atoms necessary to complete a heterocyclic nucleus of the benzoselenazole series, and a compound selected from the group consisting of hydromelonic acid, cyameluric acid, an alkali metal melonate and an alkali metal cyamelurate.

13. A photographic gelatino-silver-halide developing-out emulsion sensitized with a supersensitizing combination of a symmetrical dicarbocyanine dye selected from those represented by the following general formula:

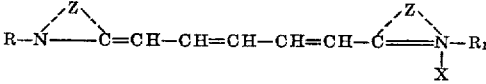

wherein R and R₁ each represents an alkyl group containing from 1 to 2 carbon atoms, X represents an acid radical and Z represents the non-metallic atoms necessary to complete a heterocyclic nucleus of the benzoselenazole series and an alkali metal melonate.

14. A photographic gelatino-silver-halide developing-out emulsion sensitized with a supersensitizing combination of 3,3′-diethylselenadicarbocyanine bromide and potassium melonate.

15. A photographic gelatino-silver-halide developing-out emulsion sensitized with a supersensitizing combination of a symmetrical dicarbocyanine dye selected from those represented by the following general formula:

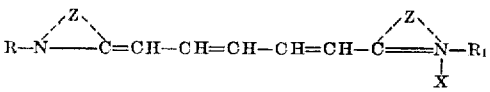

wherein R and R₁ each represents an alkyl group containing from 1 to 2 carbon atoms, X represents an acid radical, and Z represents the non-metallic atoms necessary to complete a heterocyclic nucleus of the naphthoxazole series, and a compound selected from the group consisting of hydromelonic acid, cyameluric acid, an alkali metal melonate and an alkali metal cyamelurate.

16. A photographic gelatino-silver-halide developing-out emulsion sensitized with a supersensitizing combination of a symmetrical dicarbocyanine dye selected from those represented by the following general formula:

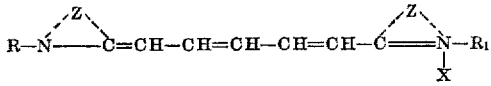

wherein R and R₁ each represents an alkyl group containing from 1 to 2 carbon atoms, X represents an acid radical and Z represents the non-metallic atoms necessary to complete a heterocyclic nucleus of the naphthoxazone series and an alkali metal melonate.

17. A photographic gelatino-silver-halide developing-out emulsion sensitized with a supersensitizing combination of 3,3'-diethyl-6,7,6',7'-dibenzoxadicarbocyanine iodide and potassium melonate.

18. A photographic gelatino-silver-halide developing-out emulsion sensitized with a supersensitizing combination of a symmetrical dicarbocyanine dye selected from those represented by the following general formula:

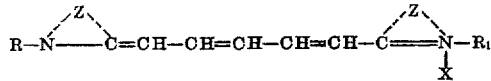

wherein R and R₁ each represents an alkyl group containing from 1 to 2 carbon atoms, X represents an acid radical, and Z represents the non-metallic atoms necessary to complete a heterocyclic nucleus of the naphthothiazole series, and a compound selected from the group consisting of hydromelonic acid, cyameluric acid, an alkali metal melonate and an alkali metal cyamelurate.

19. A photographic gelatino-silver-halide developing-out emulsion sensitized with a supersensitizing combination of a symmetrical dicarbocyanine dye selected from those represented by the following general formula:

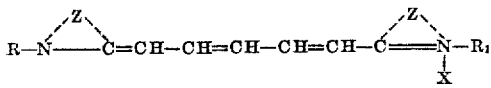

wherein R and R₁ each represents an alkyl group containing from 1 to 2 carbon atoms, X represents an acid radical and Z represents the non-metallic atoms necessary to complete a heterocyclic nucleus of the naphthothiazole series and an alkali metal melonate.

20. A photographic gelatino-silver-halide developing-out emulsion sensitized with a supersensitizing combination of 3,3'-dimethyl-4,5,4',5'-dibenzothiadicarbocyanine chloride and potassium melonate.

No references cited.

UNITED STATES PATENT OFFICE
CERTIFICATE OF CORRECTION

July 30, 1957

Patent No. 2,801,172

Jean E. Jones

It is hereby certified that error appears in the printed specification of the above numbered patent requiring correction and that the said Letters Patent should read as corrected below.

Column 2, line 31, for "5-methoxybonzoxazole," read -- 5-methoxybenzoxazole, --; column 9, lines 14 and 15, for "naphthoxazone" read -- naphthoxazole --.

Signed and sealed this 22nd day of October 1957.

(SEAL)
Attest:

KARL H. AXLINE
Attesting Officer

ROBERT C. WATSON
Commissioner of Patents